(12) United States Patent
Harck et al.

(10) Patent No.: US 11,680,658 B2
(45) Date of Patent: Jun. 20, 2023

(54) LINEAR ACTUATOR WITH A COUPLING

(71) Applicant: Danfoss A/S, Nordborg (DK)

(72) Inventors: Kurt Harck, Sonderborg (DK);
Hongmei Deng, Sonderborg (DK);
Birthe Nissen Reese, Nordborg (DK);
Jens Pawlik, Broager (DK); Sigurd Larsen, Hamburg (DE); Detlef Matzen, Aabenraa (DK)

(73) Assignee: Danfoss A/S, Nordborg (DK)

( * ) Notice: Subject to any disclaimer, the term of this patent is extended or adjusted under 35 U.S.C. 154(b) by 146 days.

(21) Appl. No.: 15/781,754

(22) PCT Filed: Dec. 6, 2016

(86) PCT No.: PCT/EP2016/079904
§ 371 (c)(1),
(2) Date: Jun. 6, 2018

(87) PCT Pub. No.: WO2017/097770
PCT Pub. Date: Jun. 15, 2017

(65) Prior Publication Data
US 2018/0363797 A1    Dec. 20, 2018

(30) Foreign Application Priority Data

Dec. 8, 2015 (EP) ..................................... 15198334
Mar. 21, 2016 (DK) .............................. PA201600169

(51) Int. Cl.
*F16K 31/04* (2006.01)
(52) U.S. Cl.
CPC ................................. *F16K 31/047* (2013.01)
(58) Field of Classification Search
CPC .................................................... F16K 31/047
See application file for complete search history.

(56) References Cited

U.S. PATENT DOCUMENTS 4,215,714 A * 8/1980 Laue ..................... F16K 11/044
137/269
4,770,390 A    9/1988 Tratz et al.
(Continued)

FOREIGN PATENT DOCUMENTS

CN    1616778 A    5/2005
CN    102410392 A    4/2012
(Continued)

OTHER PUBLICATIONS

International Search Report for PCT Serial No. PCT/EP2016/079904, dated Jan. 18, 2017.
(Continued)

*Primary Examiner* — Eric Keasel
(74) *Attorney, Agent, or Firm* — McCormick, Paulding & Huber PLLC (57) ABSTRACT

A linear actuator (1) comprising a first part (3) and a second part (5) is disclosed. The first part (3) is arranged to rotate along with a rotating part (4) of a motor (2), and the second part (5) is arranged to drive an actuated part (18, 22). A coupling (6) interconnects the first part (3) and the second part (5) to allow the second part (5) to rotate along with the first part (3) at the same angular velocity as the first part (3). The coupling (6) defines a fit tolerance between the first part (3) and the second part (5) allowing the first part (3) to rotate a predefined distance before engaging the second part (5) and rotating the second part (5) along with the first part (3). The fit tolerance ensures that the first part (3) reaches a certain angular velocity and thereby that the resulting torque transfer from the first part (3) to the second part (5) is sufficient, e.g. to release the actuated part (18, 22) from a pre-tensioned state.

17 Claims, 8 Drawing Sheets

(56) References Cited

U.S. PATENT DOCUMENTS

| | | | |
|---|---|---|---|
| 6,460,567 B1 | 10/2002 | Hansen, III et al. | |
| 6,923,427 B2* | 8/2005 | Yonezawa | F16K 31/047 251/129.11 |
| 8,402,833 B2* | 3/2013 | Alfano | G01L 19/10 73/700 |
| 9,765,900 B2* | 9/2017 | Arai | F16K 1/12 |
| 2005/0145810 A1 | 7/2005 | Yonezawa | |
| 2013/0142675 A1* | 6/2013 | Nabei | F16K 31/046 417/271 |
| 2014/0167539 A1 | 6/2014 | Neuhaus et al. | |
| 2016/0290525 A1* | 10/2016 | Hotta | F25B 41/062 |

FOREIGN PATENT DOCUMENTS

| | | |
|---|---|---|
| CN | 202513736 U | 10/2012 |
| CN | 103097789 A | 5/2013 |
| EP | 0784174 A2 | 7/1997 |
| GB | 355231 | 8/1931 |
| JP | H0849782 A | 2/1996 |
| JP | 2005-291223 A | 10/2005 |
| JP | 2006112522 A | 4/2006 |
| JP | 2014-121264 A | 6/2014 |
| WO | 2004/003414 A1 | 1/2004 |
| WO | 2012/023342 A1 | 2/2012 |

OTHER PUBLICATIONS

Notice of the Reason for Refusal for Japanese Patent Application No. 2018-529281 and its English Translation.
English Translation of Final Decision of Rejection for Japanese Patent Application No. 2018-529281 dated Apr. 27, 2021.

* cited by examiner

LINEAR ACTUATOR WITH A COUPLING

CROSS-REFERENCE TO RELATED APPLICATIONS

This application is a National Stage application of International Patent Application No. PCT/EP2016/079904, filed on Dec. 6, 2016, which claims priority to European Patent Application No. 15198334.3, filed on Dec. 8, 2015, and Danish Patent Application No. PA201600169, filed on Mar. 21, 2016, each of which is hereby incorporated by reference in its entirety.

TECHNICAL FIELD

The present invention relates to a linear actuator, in particular for moving a movable valve element of a valve. The linear actuator of the invention is capable of ensuring highly reliable operation without requiring an excessively high motor start torque.

BACKGROUND

When using linear actuators, an actuated part may become stuck or pre-tensioned in certain positions. For instance, when the actuated part is a movable valve element of a valve, the movable valve element may be pre-tensioned when the valve is in the closed position, thereby preventing leaks in the valve. When the valve is to be opened, and the movable valve element therefore needs to be moved, this pre-tension must be overcome by the linear actuator which actuates the movable valve element. This may, e.g., be achieved by providing a motor being capable of providing a sufficiently high motor torque to overcome the pre-tension. However, this will often result in the motor being over-dimensioned for the normal operation of the linear actuator, thereby increasing the costs of the linear actuator.

U.S. Pat. No. 6,460,567 B1 discloses a motor operated valve including a valve body with an inlet and outlet and a valve seat there between. A valve core reciprocates between open and closed positions by threads of the valve core cooperating with threads on a shaft which rotates with an armature of a motor.

SUMMARY

It is an object of embodiments of the invention to provide a linear actuator being capable of providing reliable operation without requiring an excessively high motor start torque.

It is a further object of embodiments of the invention to provide a linear actuator which ensures reliable actuation of an actuated part without requiring excessive motor torque.

According to a first aspect the invention provides a linear actuator comprising:
 a first part arranged to rotate along with a rotating part of a motor,
 a second part arranged to drive an actuated part, and
 a coupling interconnecting the first part and the second part to allow the second part to rotate along with the first part at the same angular velocity as the first part, the coupling defining a fit tolerance between the first part and the second part allowing the first part to rotate a predefined distance before engaging the second part and rotating the second part along with the first part.

Thus, according to the first aspect the invention provides a linear actuator. In the present context the term 'linear actuator' should be interpreted to mean an actuator which is capable of causing linear movements of an actuated part.

The linear actuator comprises a first part and a second part. The first part is arranged to rotate along with a rotating part of a motor. The first part may be the rotating part of the motor, or it may be a part which is fixedly connected to the rotating part of the motor. In any event, the first part rotates along with the rotating part of the motor, at the same angular velocity as the rotating part of the motor.

The second part is arranged to drive an actuated part. Accordingly, the second part is in contact with or forms part of an actuated part, i.e. a part which is actuated by means of the linear actuator. For instance, the second part may be arranged to convert a rotational movement into a linear movement, in order to linearly actuate the actuated part, possibly in cooperation with the actuated part.

The linear actuator further comprises a coupling interconnecting first part and the second part. The coupling allows the second part to rotate along with the first part at the same angular velocity as the first part. Accordingly, the coupling does not provide a gearing between the first part and the second part.

Furthermore, the coupling defines a fit tolerance between the first part and the second part allowing the first part to rotate a predefined distance before engaging the second part and rotating the second part along with the first part. The fit tolerance ensures that, when the motor is started in order to initiate actuation, the first part is allowed to move the predefined distance before it engages the second part. Thereby the first part is allowed to accelerate, while moving the predefined distance. Accordingly, when the first part engages the second part, it has already reached a certain angular velocity. Thereby, the torque which is transferred from the first part to the second part at the impact between the first part and the second part, via the coupling, is higher than would be the case if there was no fit tolerance, and the second part would therefore need to be accelerated along with the first part. This allows the linear actuator to provide a high start torque, without requiring an excessive motor start torque.

Furthermore, in the case that the actuated part is pre-tensioned, as described above, the linear actuator of the invention is able to overcome this pre-tension, due to the fit tolerance of the coupling, without requiring excessive motor start torque.

The first part may be a motor shaft or a rotor of the motor. In the case that the first part is a motor shaft of the motor, then the coupling is arranged between the motor shaft and another part, e.g. in the form of another shaft or a spindle. In the case that the first part is a rotor of the motor, then the coupling may, e.g., be arranged between the rotor and a motor shaft.

The second part may comprise a threaded portion, and the actuated part may comprise a linearly movable element having a threaded portion arranged to engage the threaded portion of the second part. According to this embodiment, the second part is in the form of a spindle. The threaded portion of the second part and the threaded portion of the linearly movable element interact to transform the rotational movement of the second part into a linear movement of the linearly movable element.

The threaded connection between the second part and the actuated part may be self-locking. Thereby the actuated part is automatically maintained at a given relative position between the second part and the actuated part, when the rotation of the second part stops, i.e. the actuated part will not be pushed backwards, even if a force acts on the actuated part, and without requiring a constant motor torque. This reduces the power consumption of the linear actuator.

For instance, in the case that the actuated part is a movable valve element, closing against a valve seat, then a pre-tension will be introduced when the valve is in a closed state. The self-locking capability of the threaded connection ensures that this pre-tension is maintained over time, thereby ensuring that the valve remains firmly closed until the actuator is once again activated in order to open the valve.

On the other hand, the self-locking design may lead to pre-tension of the actuated part. However, as described above, the linear actuator of the invention is capable of overcoming such a pre-tension without requiring excessive motor start torque.

The actuated part may be a movable valve element. According to this embodiment, actuation of the actuated part, by means of the linear actuator, results in movements of the movable valve element, and thereby opening or closing of a valve having the movable valve element arranged therein.

The coupling may comprise at least one protruding part formed on one of the first part and the second part, and at least one recess formed on the other of the first part and the second part, each recess being arranged to receive a protruding part, and the recess(es) may be sized and shaped to allow a relative movement of the first part and the second part, corresponding to the predefined distance, before the protruding part(s) engage(s) a wall of the recess(es).

According to this embodiment, mating portions, in the form of one or more protruding parts and one or more recesses, are formed on the first and second parts, respectively. For instance, the first/second part may be provided with a protruding part extending radially away from a rotating shaft of the first/second part, i.e. extending in a direction being substantially perpendicular to the axis of rotation of the first/second part. The second/first part may then be provided with a part arranged circumferentially with respect to the first/second part, and the circumferential part may be provided with a recess, in which the protruding part of the first/second part is arranged. The recess formed in the circumferential part of the second/first part may have an angular extension which exceeds the size of the protruding part of the first/second part, thereby allowing some relative rotational movement between the protruding part and the circumferential part. The relative rotational movement corresponds to the predefined distance.

As an alternative, the protruding part and the recess may be formed in end parts of the first and second parts. For instance, the design of the protruding part and the recess may be similar to a head of a screw and a corresponding screwdriver.

The linear actuator may further comprise a bearing arrangement supporting the second part, the bearing arrangement allowing angular movements of the second part about at least one axis being perpendicular to an axis of rotation of the first part. According to this embodiment, the second part is allowed to perform small tilting movements about at least one axis being perpendicular to the axis of rotation of the first part. Such small tilting movement will in fact cause the rotational axis of the second part to perform tilting movements, e.g. relative to the axis of rotation of the first part.

The rotational freedom of the second part perpendicular to the rotational axis of the first part allows the linear actuator to function robustly, regardless of possible assembly misalignment between the first part, rotating along with the rotating part of the motor, and the actuated part, connected to the second part. Robustness to misalignment is provided for all misalignments being smaller than the rotational freedom provided on the second part.

The bearing arrangement may, e.g., be arranged between the motor and the actuated part. As an alternative, the motor may be arranged between the bearing arrangement and the actuated part. As another alternative, the bearing arrangement may be arranged inside the motor. As yet another alternative, the bearing arrangement may form part of the coupling.

The motor may be a stepper motor. According to this embodiment, the motor is of a kind which moves in increments or steps, rather than rotating smoothly and continuously. A stepper motor is particularly suitable for the linear actuator according to the invention. For instance, sometimes, e.g. depending on an end stop position of the actuated part, the coupling may be in a position where the first part is not allowed to reach a sufficient angular velocity before it engages the second part. In this case the motor will not be able to follow the specified commutation sequence, due to insufficient transient torque, upon impact between the first part and the second part. As a consequence, the motor automatically reverses, e.g. by one step, thereby bringing the coupling into a position which allows the first part to reach a sufficient angular velocity before engaging the second part, when the motor is once again operating in a forwards direction. Thereby it is ensured that a sufficient torque transfer between the first part and the second part is obtained, regardless of the initial position of the coupling, and without requiring any control feedback from the motor to an electronic driver circuit. In the case that another kind of motor is used, relatively complicated motor control may be required, including control feedback from the motor, in order to obtain a similar operating pattern. Furthermore, in the case that a single impact between the first part and the second part is insufficient to release the pre-tensioned actuated part, the stepper motor will reverse, in the manner described above, causing an additional impact between the first part and the second part. This may be repeated until the actuated part has been released from the pre-tensioned state. Once again, this is obtained automatically, and without requiring motor feedback or complicated control of the motor.

The predefined distance may correspond to at least 0.25 full step of the stepper motor, such as at least 0.50 full step of the stepper motor, such as at least 0.75 full step of the stepper motor, such as at least 1.00 full step of the stepper motor.

It should be ensured that the predefined distance is sufficient to allow the motor to accelerate the first part to an angular velocity which provides a desired torque transfer from the first part to the second part when the first part engages the second part. In the case that the motor is a stepper motor, the maximum angular velocity of the motor is normally obtained within a single full step, and often within significantly less than a full step. It can therefore be assumed, that a sufficient angular velocity can be reached within the first full step after operation of the motor has been initiated, e.g. within 0.25 of the first full step. Thus, when the predefined distance corresponds to at least 0.25 of a full step of the stepper motor, it is ensured that the motor is allowed to accelerate to maximum angular velocity while the first part moves the predefined distance relative to the second part, i.e. before the first part engages the second part, and thereby it is ensured that the torque transfer from the first part to the second part upon impact is sufficient, e.g. to overcome a pre-tension of the actuated part. In the case that the actuated part is a movable valve element, this will improve the opening performance of the valve.

Alternatively or additionally, the predefined distance may correspond to at most 2 full steps of the stepper motor, such as at most 1.75 full steps of the stepper motor, such as at most 1.50 full steps of the stepper motor, such as at most 1.00 full step of the stepper motor.

If the predefined distance is longer than a distance allowing the motor, and thereby the first part, to reach a maximum angular velocity, then the torque transfer from the first part to the second part is not increased if the predefined distance is increased further. On the other hand, a relatively long predefined distance may increase a torque which causes pre-tension of the actuated part. Increasing the pre-tension of the actuated part in this configuration is executed by continuously driving the stepper motor past an end stop position of the actuated part, thereby introducing the transfer of high transient torque peaks for every step past the end stop position. In effect, the torque required in order to overcome the pre-tension is also increased. It is therefore an advantage to limit the predefined distance to a level which, on the one hand, ensures a sufficient torque transfer from the first part to the second part and, on the other hand, limits the pre-tension of the actuated part. This will be obtained by selecting a predefined distance corresponding to at most 2 full steps of the stepper motor. For instance, in the case that the actuated part is a movable valve member, a pre-tension may be introduced when the movable valve element is moved into a closed position of the valve, and the introduced pre-tension must be overcome when the valve is once again opened.

The fit tolerance of the coupling may be selected to provide an output torque of the first part when engaging the second part, which exceeds a predefined threshold output torque. As described above, the fit tolerance allows the first part to be accelerated to a certain angular velocity before it engages the second part. This angular velocity provides a certain output torque of the first part, and thereby a certain torque transfer from the first part to the second part upon impact.

The threshold output torque may correspond to a torque required in order to release the actuated part from a pre-tensioned state. According to this embodiment, the fit tolerance of the coupling is selected in such a manner that it is ensured that when the first part engages the second part, the impact is sufficient to release the actuated part from a pre-tensioned state. Thereby it is ensured that the linear actuator operates reliably. For instance, in the case that the actuated part is a movable valve part, reliable opening performance of the valve is ensured.

According to a second aspect the invention provides a valve comprising a fluid inlet, a fluid outlet, a stationary valve element arranged in a flow path between the fluid inlet and the fluid outlet, and a movable valve element arranged to cooperate with the stationary valve element in order to define an opening degree of the valve, the valve further comprising a linear actuator according to the first aspect of the invention, the linear actuator being arranged to actuate the movable valve element.

It should be noted that a person skilled in the art would readily recognise that any feature described in combination with the first aspect of the invention could also be combined with the second aspect of the invention, and vice versa. The remarks set forth above are therefore equally applicable here. The stationary valve element could, e.g., be or comprise a valve seat.

In particular, since the valve according to the second aspect of the invention comprises a linear actuator according to the first aspect of the invention, the opening performance of the valve is reliable.

BRIEF DESCRIPTION OF THE DRAWINGS

The invention will now be described in further detail with reference to the accompanying drawings in which.

DETAILED DESCRIPTION

Figures 1A, 1B, 1C, 1D:
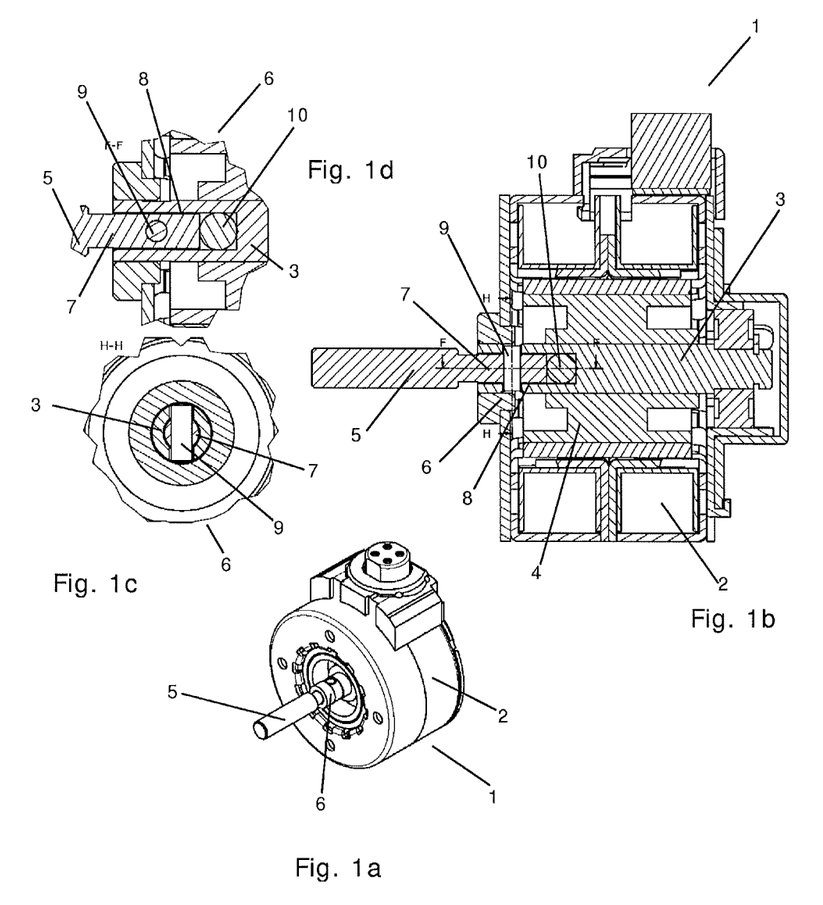
FIGS. 1a-1d illustrate a linear actuator according to a first embodiment of the invention.

FIGS. 1a-1d illustrate a linear actuator 1 according to a first embodiment of the invention. FIG. 1a is a perspective view of the linear actuator 1, and FIG. 1b is a cross sectional view of the linear actuator 1.

The linear actuator 1 comprises a stepper motor 2, a first part 3 arranged to rotate along with a rotating part 4 of the stepper motor 2, and a second part 5, in the form of a shaft extending away from the stepper motor 2. The first part 3 shown in FIGS. 1a and 1b is in the form of a rotor shaft being fixedly connected to the rotating part 4 of the stepper motor 2.

A coupling 6 interconnects the first part 3 and the second part 5. Thereby the second part 5 can rotate along with the first part 3, at the same angular velocity as the first part 3. The coupling 6 is shown in further detail in FIGS. 1c and 1d.

FIG. 1c is a cross sectional view of the linear actuator 1 along the line H-H illustrated in FIG. 1b, and FIG. 1d is a cross sectional view of the linear actuator 1 along the line F-F illustrated in FIG. 1b.

The second part 5 is provided with a protruding part 7, and the first part 3 is provided with a recess 8, in which the protruding part 7 of the second part 5 is received. A rod 9 intersects the first part 3 as well as the second part 5, thereby allowing the second part 5 to rotate along with the first part 3.

A small fit tolerance is defined between the rod 9 and the first part 3 and the protruding part 7 of the second part 5. The fit tolerance allows the first part 3 to rotate slightly before the rod 9 engages a wall of the second part 5, and thereby rotates the second part 5 along with the first part 3. Accordingly, when operation of the stepper motor 2 is initiated, in order to operate the linear actuator 1, the first part 3 is allowed to accelerate to a certain angular velocity before it engages the second part 5. Thereby the torque transfer from the first part 3 to the second part 5 upon impact is higher than would be the case if the second part 5 was simply rotated along with the first part 3 from the onset. This increased torque transfer is sufficient to overcome a pre-tension of an actuated part, e.g. in the form of 'sticking' of a valve element arranged in a closed position. The fit tolerance may, e.g., correspond to at least 0.15 or 0.25 of a full step of the stepper motor 2 and/or to at most 2 full steps of the stepper motor 2, as described above.

A ball 10 is further arranged in the recess 8 of the first part 3. The ball 10 allows the second part 5 to perform small tilting movements relative to the first part 3. Furthermore, the recess 8 is slightly larger than the protruding part 7 received in the recess 8, thereby allowing these tilting movements of the second part 5 relative to the first part 3.

Figure 2A:
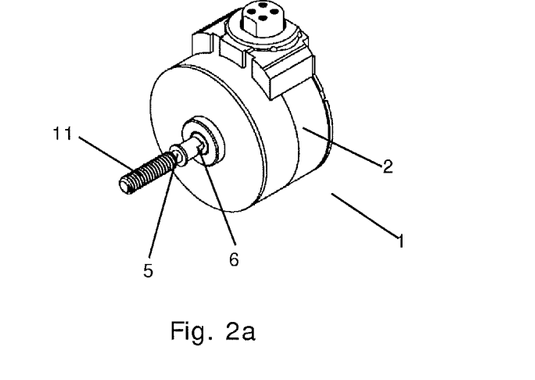
FIGS. 2a-2c illustrate a linear actuator according to a second embodiment of the invention.
Figure 2B:
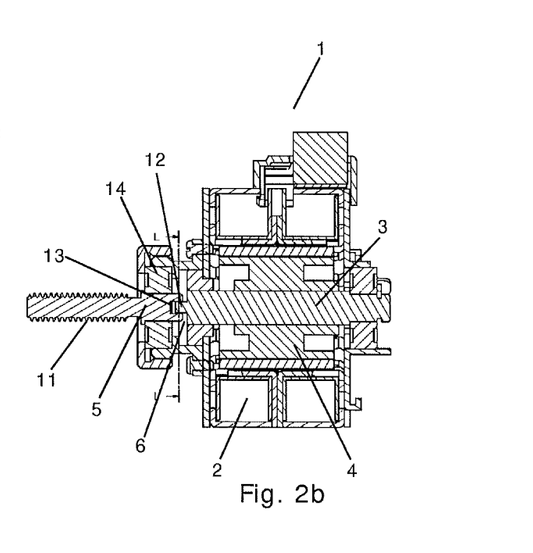
Figure 2C:
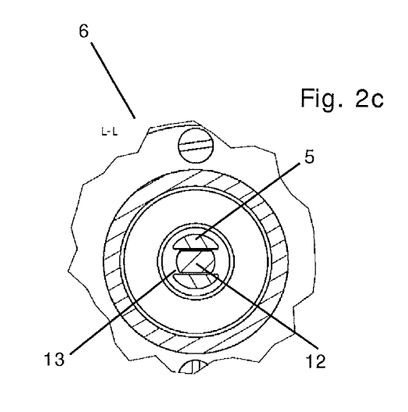

FIGS. 2*a*-2*c* illustrate a linear actuator 1 according to a second embodiment of the invention. FIG. 2*a* is a perspective view of the linear actuator 1, and FIG. 2*b* is a cross sectional view of the linear actuator 1.

The linear actuator 1 comprises a stepper motor 2, a first part 3 arranged to rotate along with a rotating part 4 of the stepper motor 2, and a second part 5, in the form of a shaft extending away from the stepper motor 2. The first part 3 shown in FIGS. 2*a* and 2*b* is in the form of a rotor shaft being fixedly connected to the rotating part 4 of the stepper motor 2. The second part 5 is provided with a threaded portion 11 arranged to engage with a threaded portion formed on an actuated part in order to transform rotational movements of the second part 5 into linear movements of the actuated part.

A coupling 6 interconnects the first part 3 and the second part 5. Thereby the second part 5 can rotate along with the first part 3, at the same angular velocity as the first part 3. The coupling 6 is shown in further detail in FIG. 2*c*.

FIG. 2*c* is a cross sectional view of the linear actuator 1 along the line L-L illustrated in FIG. 2*b*.

The first part 3 is provided with a protruding part 12, and the second part 5 is provided with a recess 13, in which the protruding part 12 of the first part 3 is received. The cooperation between the protruding part 12 and the recess 13 allows the second part 5 to be rotated along with the first part 3.

A small fit tolerance is defined between the protruding part 12 and the recess 13. The fit tolerance allows the first part 3 to rotate slightly before protruding part 12 engages a wall of the recess 13, and thereby rotates the second part 5 along with the first part 3. Accordingly, and increased torque transfer from the first part 3 to the second part 5 is obtained, similarly to the situation described above with reference to FIGS. 1*a*-1*d*. The fit tolerance may, e.g., correspond to at least 0.15or 0.25 of a full step of the stepper motor 2 and/or to at most 2 full steps of the stepper motor 2, as described above.

A bearing arrangement 14 supports the second part 5 in such a manner that the second part 5 is allowed to perform slight tilting movements relative to the first part 3.

Figures 3A, 3B, 3C, 3D:
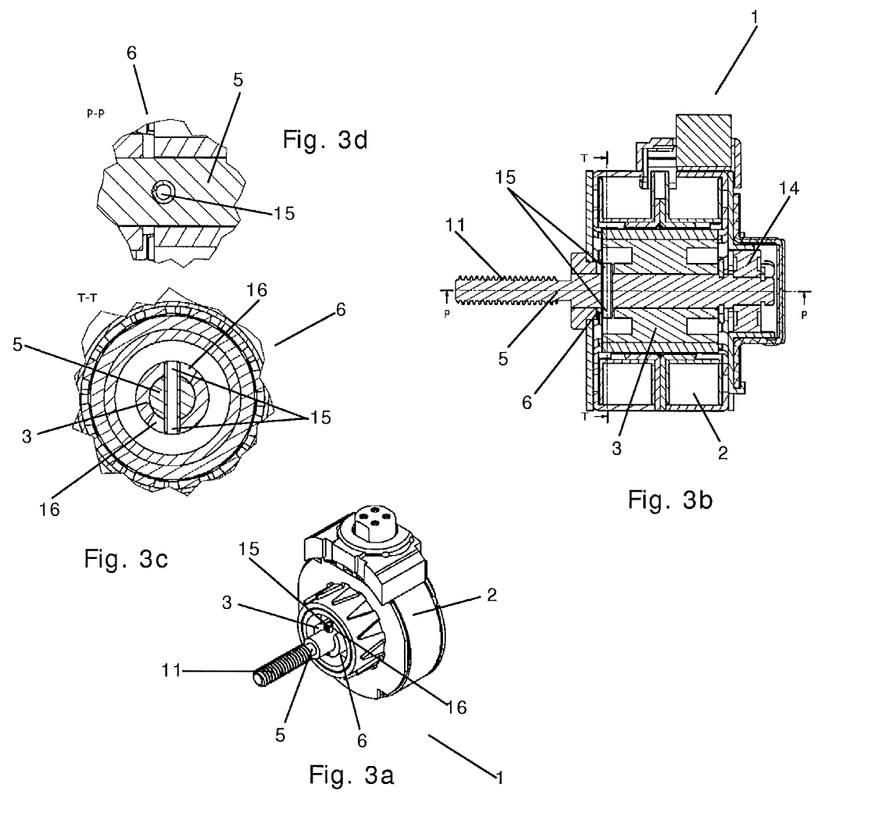
FIGS. 3a-3d illustrate a linear actuator according to a third embodiment of the invention.

FIGS. 3*a*-3*d* illustrate a linear actuator 1 according to a third embodiment of the invention. FIG. 3*a* is a perspective view of the linear actuator 1, and FIG. 3*b* is a cross sectional view of the linear actuator 1.

The linear actuator 1 comprises a stepper motor 2, a first part 3, in the form of a rotating part of the stepper motor 2, and a second part 5, in the form of a motor shaft including a part extending away from the stepper motor 2. The second part 5 is provided with a threaded portion 11 arranged to engage with a threaded portion formed on an actuated part in order to transform rotational movements of the second part 5 into linear movements of the actuated part.

A coupling 6 interconnects the first part 3 and the second part 5. Thereby the second part 5 can rotate along with the first part 3, at the same angular velocity as the first part 3. The coupling 6 is shown in further detail in FIGS. 3*c* and 3*d*.

FIG. 3*c* is a cross sectional view of the linear actuator 1 along the line T-T illustrated in FIG. 3*b*, and FIG. 3*d* is a cross sectional view of the linear actuator 1 along the line P-P illustrated in FIG. 3*b*.

The second part 5 is provided with a rod providing two protruding parts 15, extending away from the second part 5 on opposing sides of the second part 5. The first part 3 is provided with two recesses 16, in which the protruding parts 15 of the second part 5 are received. The cooperation between the protruding parts 15 and the recesses 16 allow the second part 5 to be rotated along with the first part 3.

A fit tolerance is defined between the protruding parts 15 and the recesses 16. The fit tolerance allows the first part 3 to rotate slightly before protruding parts 15 each engages a wall of a recess 16, and thereby rotates the second part 5 along with the first part 3. Accordingly, and increased torque transfer from the first part 3 to the second part 5 is obtained, similarly to the situation described above with reference to FIGS. 1*a*-1*d*. The fit tolerance may, e.g., correspond to at least 0.15 or 0.25 of a full step of the stepper motor 2 and/or to at most 2 full steps of the stepper motor 2, as described above.

A bearing arrangement 14 supports the second part 5 in such a manner that the second part 5 is allowed to perform slight tilting movements.

Figures 4A, 4B, 4C, 4D:
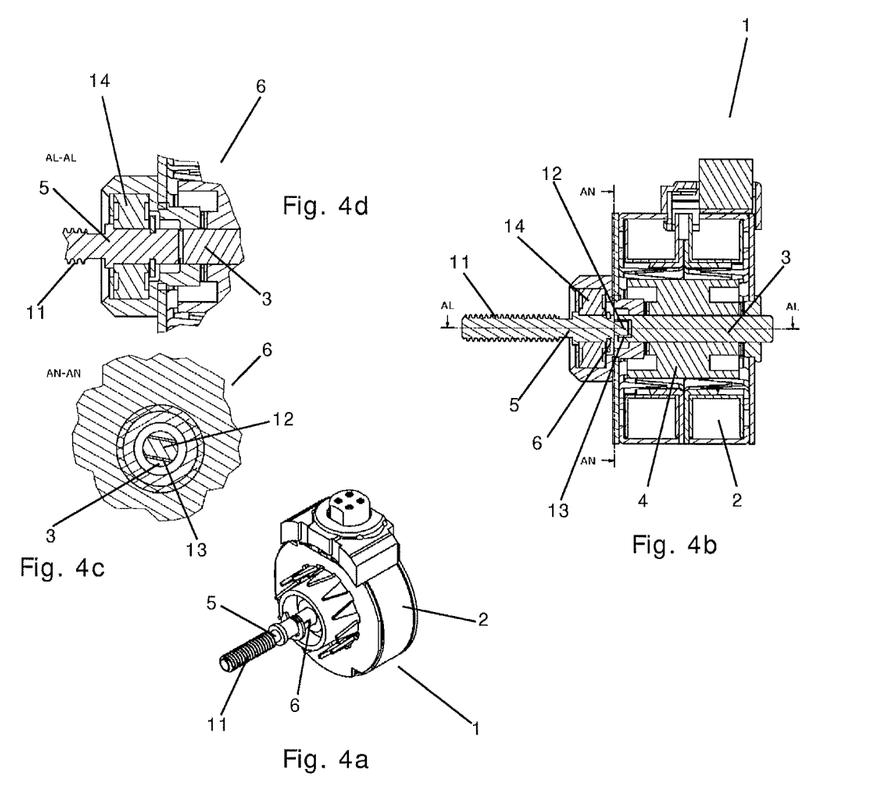
FIGS. 4a-4d illustrate a linear actuator according to a fourth embodiment of the invention.

FIGS. 4*a*-4*d* illustrate a linear actuator 1 according to a fourth embodiment of the invention. FIG. 4*a* is a perspective view of the linear actuator 1, and FIG. 4*b* is a cross sectional view of the linear actuator 1.

The linear actuator 1 comprises a stepper motor 2, a first part 3 arranged to rotate along with a rotating part 4 of the stepper motor 2, and a second part 5, in the form of a shaft extending away from the stepper motor 2. The first part 3 shown in FIGS. 4*a* and 4*b* is in the form of a rotor shaft being fixedly connected to the rotating part 4 of the stepper motor 2. The second part 5 is provided with a threaded portion 11 arranged to engage with a threaded portion formed on an actuated part in order to transform rotational movements of the second part 5 into linear movements of the actuated part.

A coupling 6 interconnects the first part 3 and the second part 5. Thereby the second part 5 can rotate along with the first part 3, at the same angular velocity as the first part 3. The coupling 6 is shown in further detail in FIGS. 4*c* and 4*d*.

FIG. 4*c* is a cross sectional view of the linear actuator 1 along the line AN-AN illustrated in FIG. 4*b*, and FIG. 4*d* is a cross sectional view of the linear actuator 1 along the line AL-AL illustrated in FIG. 4*b*.

The second part 5 is provided with a protruding part 12, and the first part 3 is provided with a recess 13, in which the protruding part 12 of the second part 5 is received. The cooperation between the protruding part 12 and the recess 13 allows the second part 5 to be rotated along with the first part 3. This is similar to the embodiment illustrated in FIGS. 2*a*-2*c*.

A small fit tolerance is defined between the protruding part 12 and the recess 13. The fit tolerance allows the first part 3 to rotate slightly before a wall of the recess 13 engages the protruding part 12, and thereby rotates the second part 5 along with the first part 3. Accordingly, and increased torque transfer from the first part 3 to the second part 5 is obtained, similarly to the situation described above with reference to FIGS. 1*a*-1*d*. The fit tolerance may, e.g., correspond to at least 0.15 or 0.25 of a full step of the stepper motor 2 and/or to at most 2 full steps of the stepper motor 2, as described above.

A bearing arrangement 14 supports the second part 5 in such a manner that the second part 5 is allowed to perform slight tilting movements.

Figures 5A, 5B, 5C, 5D:
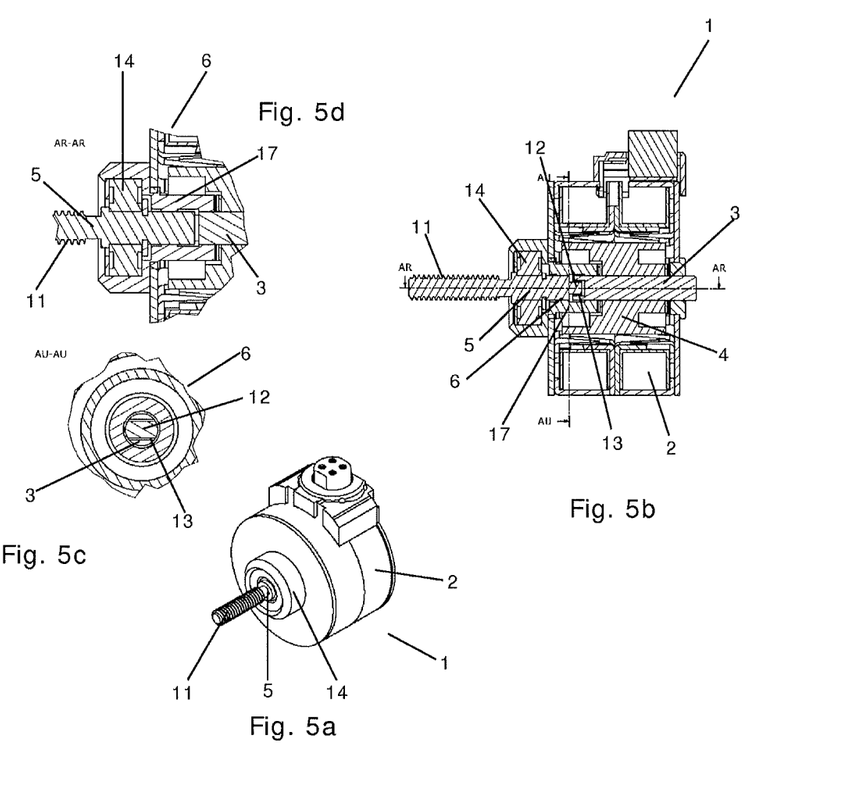
FIGS. 5a-5d illustrate a linear actuator according to a fifth embodiment of the invention.

FIGS. 5a-5d illustrate a linear actuator according to a fifth embodiment of the invention. FIG. 5a is a perspective view of the linear actuator 1, and FIG. 5b is a cross sectional view of the linear actuator 1. FIG. 5c is a cross sectional view of the linear actuator 1 along the line AU-AU illustrated in FIG. 5b, and FIG. 5d is a cross sectional view of the linear actuator 1 along the line AR-AR illustrated in FIG. 5b.

The linear actuator 1 of FIGS. 5a-5d is very similar to the linear actuator 1 of FIGS. 4a-4b, and it will therefore not be described in detail here. However, in the linear actuator 1 of FIGS. 5a-5d the coupling 6 is arranged further inside the stepper motor 2 than is the case in the linear actuator 1 of FIGS. 4a-4d. This has the consequence that the second part 5 is supported by an additional bearing 17 arranged inside the stepper motor 2, as well as by the bearing arrangement 14.

Figure 6A:
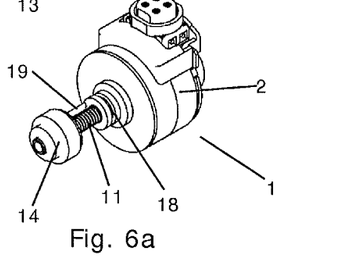
FIGS. 6a-6d illustrate a linear actuator according to a sixth embodiment of the invention.
Figure 6B:
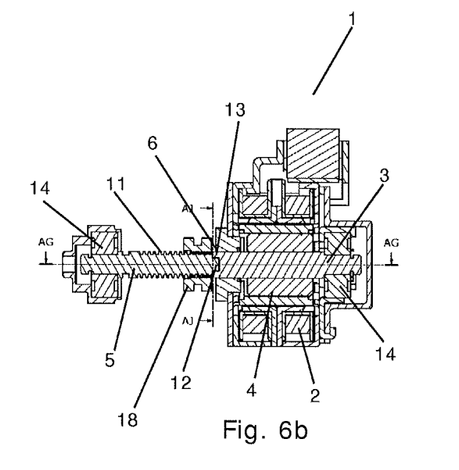
Figure 6C:
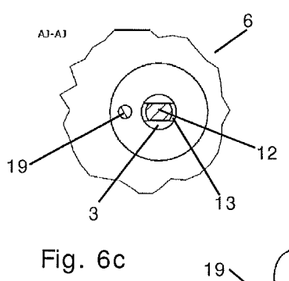
Figure 6D:
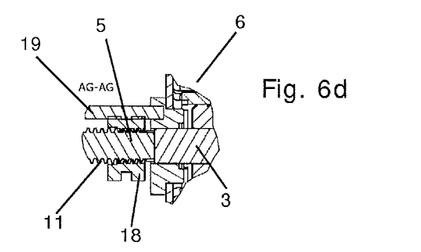

FIGS. 6a-6d illustrate a linear actuator 1 according to a sixth embodiment of the invention. FIG. 6a is a perspective view of the linear actuator 1, and FIG. 6b is a cross sectional view of the linear actuator 1. FIG. 6c is a cross sectional view of the linear actuator 1 along the line AJ-AJ illustrated in FIG. 6b, and FIG. 6d is a cross sectional view of the linear actuator 1 along the line AG-AG illustrated in FIG. 6b.

The linear actuator 1 of FIGS. 6a-6d is very similar to the linear actuator 1 of FIGS. 4a-4b, in the sense that the coupling 6 of the linear actuator 1 of FIGS. 6a-6d is similar to the coupling 6 of the linear actuator 1 of FIGS. 4a-4d. The linear actuator 1, and in particular the coupling 6, of FIGS. 6a-6d will therefore not be described in detail here.

The linear actuator 1 of FIGS. 6a-6d is provided with two bearing arrangements 14, one arranged behind the stepper motor 2 and supporting the first part 3, and one arranged at an end part of the second part 5 and supporting the second part 5.

A nut 18 having an inner thread is arranged on the threaded portion 11 of the second part 5 in such a manner that the inner thread of the nut 18 engages the thread formed on the second part 5. A rod 19 prevents the nut 18 from rotating. Accordingly, when the second part 5 rotates, the nut 18 performs a linear movement along the length of the second part 5, i.e. the threaded connection causes the rotational movement of the second part 5 to be transformed into a linear movement of the nut 18. The nut 18 may in turn be connected to an actuated part, such as a movable valve element. Thereby the actuated part will be moved linearly along with the nut 18.

Figures 7A, 7B:
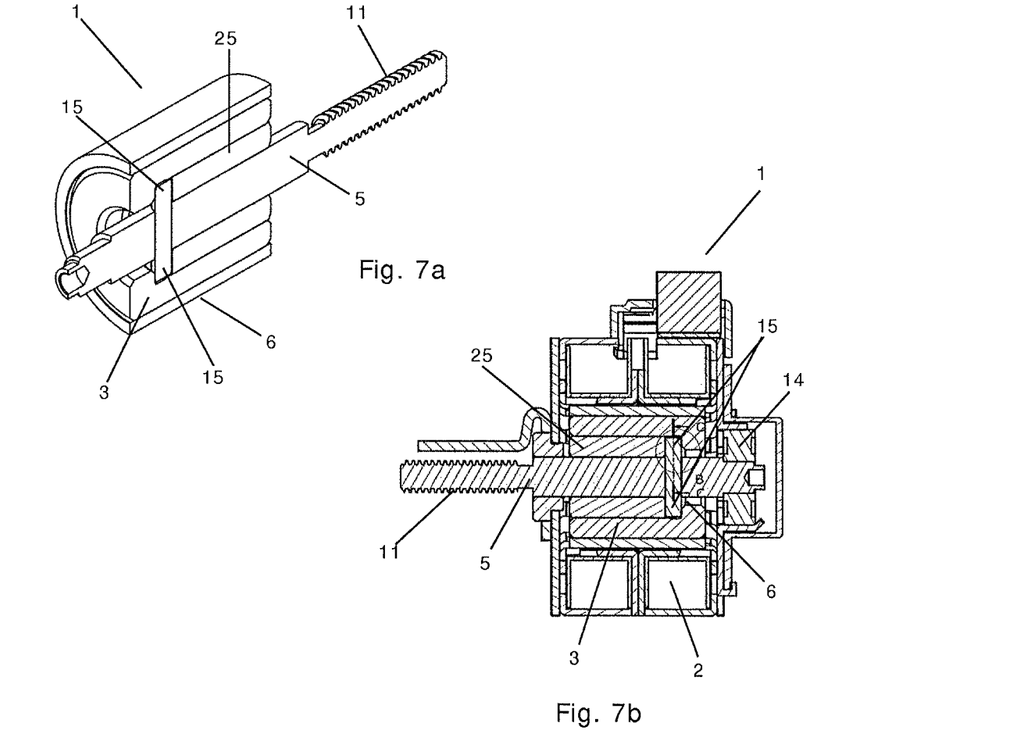
FIGS. 7a-7d illustrate a linear actuator according to a seventh embodiment of the invention.
Figure 7C:
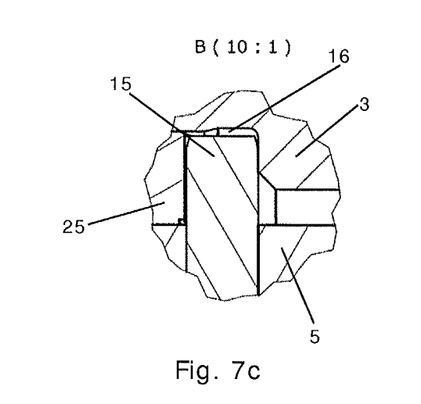
Figure 7D:
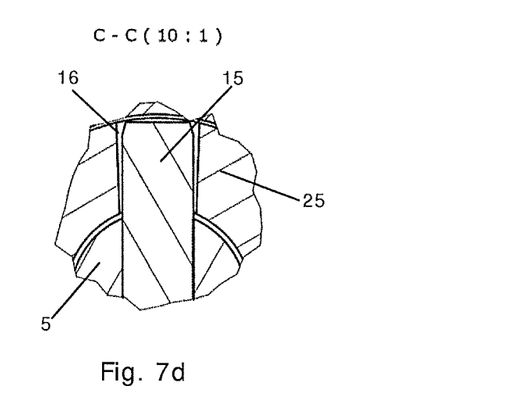

FIGS. 7a-7d illustrate a linear actuator 1 according to a seventh embodiment of the invention. FIG. 7a is a perspective cross sectional view of the rotating parts of the linear actuator 1, and FIG. 7b is a cross sectional view of the linear actuator 1. FIG. 7c is an enlarged view corresponding to the circle marked 'B' in FIG. 7b, and FIG. 7d is a cross sectional view of the linear actuator 1 along the line C-C illustrated in FIG. 7b.

The linear actuator 1 of FIGS. 7a-7d is very similar to the linear actuator 1 of FIGS. 3a-3d, in the sense that the coupling 6 of the linear actuator 1 of FIGS. 7a-7d is similar to the coupling 6 of the linear actuator 1 of FIGS. 3a-3d. The linear actuator 1 of FIGS. 7a-7d will therefore not be described in detail here. However, in the linear actuator 1 of FIGS. 7a-7d, the coupling 6 is arranged further inside the stepper motor 2 than is the case in the linear actuator 1 of FIGS. 3a-3d.

The linear actuator 1 of FIGS. 7a-7d comprises a sliding bearing 25 forming a sliding interface between the first part 3 and the second part 5. The sliding bearing 25 is fixedly attached to the first part 3, in the form of the rotating part of the stepper motor 2. However, the sliding bearing 25 can easily move relative to the second part 5. Thereby it is reliably ensured that the first part 3 is allowed to accelerate to a sufficient angular velocity before the protruding parts 15 engage the walls of the recesses 16, and thereby rotates the second part 5 along with the first part 3.

In the linear actuator 1 of FIGS. 7a-7d, the recesses 16 are formed in the sliding bearing 25, instead of being formed directly in the rotating part of the stepper motor 2. This is an advantage because it is easier to form the recesses 16 in the sliding bearing 25, and subsequently attach the sliding bearing 25 to the rotating part of the stepper motor 2, than it is to form the recesses 16 directly in the rotating part of the stepper motor 2.

Figure 8A:
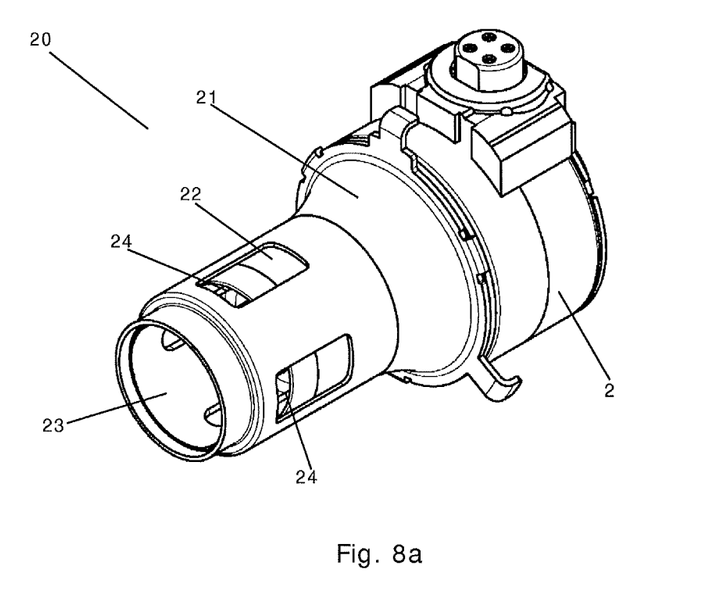
FIGS. 8a-8b illustrate a valve according to an embodiment of the invention.
Figure 8B:
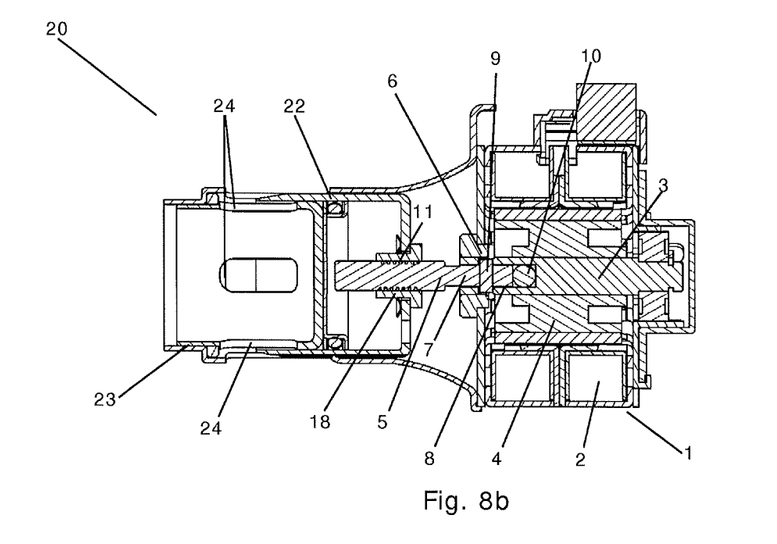

FIGS. 8a-8b illustrate a valve 20 according to an embodiment of the invention. FIG. 8a is a perspective view of the valve 20, and FIG. 8b is a cross sectional view of the valve 20. The valve 20 comprises a linear actuator 1 of the kind illustrated in FIGS. 1a-1d arranged inside a valve housing 21. It should, however, be noted that the valve 20 could, alternatively, comprise one of the linear actuators 1 illustrated in FIGS. 2a-6d.

A nut 18 being provided with an inner thread is arranged on the threaded portion 11 of the second part 5. Similar to the situation described above with reference to FIGS. 6a-6d, rotational movements of the second part 5 are thereby transformed into linear movements of the nut 18.

The nut 18 is connected to a movable valve element 22. Thus, when the nut 18 moves linearly, the movable valve element 22 is also moved linearly. Thereby a relative position between the movable valve element 22 and a stationary valve element 23 is changed. The stationary valve element 23 is in the form of a sleeve arranged inside the valve housing 21, and which is stationary with respect to the valve housing 21. The sleeve is provided with a number of openings 24. When the movable valve element 22 is moved relative to the stationary valve element 23, a part of the openings 24 being covered by the valve element 22 is changed. Thereby the size of a fluid passage defined by the part of the openings 24 which is not covered by the movable valve element 22 is also changed. Accordingly, the opening degree of the valve 20 is changed.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A linear actuator comprising:
    a first part arranged to rotate along with a rotating part of a stepper motor,
    a second part arranged to drive an actuated part, and
    a coupling interconnecting the first part and the second part to allow the second part to rotate along with the first part at the same angular velocity as the first part, the coupling defining a fit tolerance between the first part and the second part wherein the first part rotates an angular degree of rotation in the range of 0.15-2 full steps of the stepper motor before engaging the second part and rotating the second part along with the first part.

2. The linear actuator according to claim 1, wherein the first part is a motor shaft or a rotor of the motor.

3. The linear actuator according to claim 2, wherein the second part comprises a threaded portion, and wherein the actuated part comprises a linearly movable element having a threaded portion arranged to engage the threaded portion of the second part.

4. The linear actuator according to claim 2, wherein the actuated part is a movable valve element.

5. The linear actuator according to claim 1, wherein the second part comprises a threaded portion, and wherein the actuated part comprises a linearly movable element having a threaded portion arranged to engage the threaded portion of the second part.

6. The linear actuator according to claim 5, wherein the actuated part is a movable valve element.

7. The linear actuator according to claim 5, wherein the threaded connection between the second part and the actuated part is self-locking.

8. The linear actuator according to claim 7, wherein the actuated part is a movable valve element.

9. The linear actuator according to claim 1, wherein the actuated part is a movable valve element.

10. The linear actuator according to claim 1, wherein the coupling comprises at least one protruding part formed on one of the first part and the second part, and at least one recess formed on the other of the first part and the second part, each recess being arranged to receive a protruding part, and wherein the recess(es) is/are sized and shaped to allow a relative movement of the first part and the second part, corresponding to the angular degree of rotation, before the protruding part(s) engage(s) a wall of the recess(es).

11. The linear actuator according to claim 1, wherein the first part comprises a sliding bearing arranged to form a sliding interface between the first part and the second part.

12. The linear actuator according to claim 11, wherein at least one recess is formed in the sliding bearing.

13. The linear actuator according to claim 1, further comprising a bearing arrangement supporting the second part, the bearing arrangement allowing angular movements of the second part about at least one axis being perpendicular to an axis of rotation of the first part.

14. The linear actuator according to claim 1, wherein the fit tolerance of the coupling is selected to provide an output torque of the first part when engaging the second part, which exceeds a predefined threshold output torque.

15. The linear actuator according to claim 14, wherein the threshold output torque corresponds to a torque required in order to release the actuated part from a pre-tensioned state.

16. A valve comprising a fluid inlet, a fluid outlet, a stationary valve element arranged in a flow path between the fluid inlet and the fluid outlet, and a movable valve element arranged to cooperate with the stationary valve element in order to define an opening degree of the valve, the valve further comprising a linear actuator according to claim 1, the linear actuator being arranged to actuate the movable valve element.

17. A linear actuator comprising:
a first part arranged to rotate along with a rotating part of a stepper motor,
a second part arranged to drive an actuated part, and
a coupling interconnecting the first part and the second part to allow the second part to rotate along with the first part at the same angular velocity as the first part, the coupling defining a fit tolerance between the first part and the second part wherein the first part rotates an angular degree of rotation in the range of 0.15-2 full steps of the stepper motor before engaging the second part and rotating the second part along with the first part,
wherein relative axial movement between the first part and the second part is prohibited by the coupling.

* * * * *